United States Patent
Hirata et al.

(10) Patent No.: US 8,411,391 B2
(45) Date of Patent: Apr. 2, 2013

(54) HEAD GIMBAL ASSEMBLY

(75) Inventors: Masakazu Hirata, Chiba (JP); Manabu Oumi, Chiba (JP); Majung Park, Chiba (JP); Mizuaki Suzuki, Chiba (JP)

(73) Assignee: Seiko Instruments Inc. (JP)

( * ) Notice: Subject to any disclaimer, the term of this patent is extended or adjusted under 35 U.S.C. 154(b) by 780 days.

(21) Appl. No.: 12/586,796

(22) Filed: Sep. 28, 2009

(65) Prior Publication Data
US 2010/0085664 A1 Apr. 8, 2010

(30) Foreign Application Priority Data

Oct. 1, 2008 (JP) .................................. 2008-256272
Jan. 26, 2009 (JP) .................................. 2009-014488

(51) Int. Cl.
*G11B 21/16* (2006.01)
(52) U.S. Cl. .................................................... 360/244.1
(58) Field of Classification Search ............... 360/244.1, 360/245.9, 245, 245.7, 245.3, 245.8, 245.2, 360/245.1, 244.3, 244.9, 244.8, 244.5, 244.2, 360/244
See application file for complete search history.

(56) References Cited

U.S. PATENT DOCUMENTS

| | | | |
|---|---|---|---|
| 2007/0230288 A1* | 10/2007 | Nishida et al. | 369/13.13 |
| 2010/0007980 A1* | 1/2010 | Kim et al. | 360/59 |
| 2011/0007621 A1* | 1/2011 | Park et al. | 369/112.01 |
| 2011/0019510 A1* | 1/2011 | Nishida et al. | 369/13.12 |
| 2011/0122736 A1* | 5/2011 | Park et al. | 369/13.17 |
| 2011/0122738 A1* | 5/2011 | Hirata et al. | 369/13.32 |
| 2011/0188355 A1* | 8/2011 | Hirata et al. | 369/13.33 |

OTHER PUBLICATIONS

Patent Abstracts, publication No. WO00/28536, publication date May 18, 2000.
Patent Abstracts of Japan, publication No. 2001-297463, publication date Oct. 26, 2001.

* cited by examiner

*Primary Examiner* — Allen Cao
(74) *Attorney, Agent, or Firm* — Adams & Wilks

(57) ABSTRACT

A head gimbal assembly comprises a slider having reproduction/reproducing elements for reproducing and recording information to/from a surface of a recording medium. A suspension flexibly supports the slider opposite to a surface of a recording medium. A light source is disposed on the suspension for emitting a light beam. An optical waveguide is disposed between the slider and the laser light source for introducing a light beam from the light source into the slider.

20 Claims, 11 Drawing Sheets

X DIRECTION
Y DIRECTION
Z DIRECTION

HEAD GIMBAL ASSEMBLY

BACKGROUND OF THE INVENTION

1. Field of the Invention

The present invention relates to a head gimbal assembly with a light guide structure and an information recording/reproducing apparatus which record or reproduce various kinds of pieces of information in or from magnetic recording media by utilizing spotlight that is condensed light.

2. Background Information

In recent years, along with an increase in the storage capacity of a hard disk or the like included in computer equipment, the information recording density for a single recording surface has increased. For example, in order to increase the recording capacity per unit area on a magnetic disk, the surface recording density has to be raised. However, as the recording density gets higher, a recording area on the recording medium occupied by one bit gets smaller. When the bit size decreases, energy representing information of one bit approaches to thermal energy at room temperature. Eventually, the recorded information may be reversed or deleted due to heat fluctuation, or any other problem relating to thermal demagnetization arises.

In a generally adopted longitudinal recording method that is a method of recording magnetic variations so that a magnetizing direction will be a longitudinal direction of a recording medium, disappearance of recorded information is liable to occur due to the foregoing thermal demagnetization. For overcoming this drawback, there is a tendency toward a perpendicular recording method of recording a magnetization signal in a direction perpendicular to the recording medium. The perpendicular recording method is a method of recording magnetic information according to the principle of approaching a sole magnetic pole to the recording medium. According to the method, a recording magnetic field is oriented in a direction nearly perpendicular to a recording film.

Information recorded with a perpendicular magnetic field is likely to remain stable in terms of energy, because the north pole and south pole hardly produce a loop in the surface of the recording film. Therefore, compared with the longitudinal recording method, the perpendicular recording method is unsusceptible to thermal demagnetization.

However, in recent years, recording media have been requested to support higher-density recording so as to meet a need for recording or reproducing a larger amount of higher-density information. Therefore, a medium whose coercive force is strong is beginning to be adopted as a recording medium in order to minimize an effect of a magnetic domain on an adjoining one or thermal fluctuation. Therefore, even when the aforesaid perpendicular recording method is adopted, it has become hard to record information in the recording medium.

In order to overcome the foregoing drawback, a hybrid magnetic recording method of locally heating a magnetic domain by utilizing spotlight that is condensed light, or near-field light that is condensed light, thus temporarily lowering a coercive force, and performing writing has been proposed. In particular, when near-field light is utilized, optical information in a region equal to or smaller than a wavelength of light regarded as a limit for existing optical systems can be dealt with. Therefore, record bits can be formed at a higher density than they can in existing optical information recording/reproducing apparatuses.

The configuration of a recording/reproducing apparatus utilizing near-field light is substantially identical to that of a magnetic disk drive. However, a near-field light utilization head is substituted for a magnetic head. The near-field light utilization head has a near-field light generation element formed with an optically microscopic aperture or a projection whose size is on the order of nanometers. The near-field light generation element is mounted in a slider realized using an air-cushion technology. The slider is attached to the distal end of a suspension, and floated at a constant height relative to a recording medium owing to a dynamic pressure. Eventually, the near-field light generation element accesses an arbitrary data mark existent in a recording medium. The near-field light utilization head is provided with a flexing capability to stabilize the posture thereof against a surge of a recording medium so that the slider will follow the recording medium rotated at a high speed. For the near-field light utilization head having the construction, a light introduction unit formed with an optical waveguide or the like is necessary to feed of light to the head. The optical waveguide includes an optical fiber. How efficiently light is introduced into the near-field light generation element and recording medium using the optical waveguide which offers lower freedom in layout than an electrical wiring does is a critical point of the recording/reproducing technology that utilizes near-field light.

For the near-field light utilization head, a technique of coupling the optical waveguide to the slider, and routing a microscopic beam spot to the near-field light generation element using a light reflecting surface, which reflects light that is propagated in a direction horizontal to a medium surface through the optical waveguide, so as to square the direction of propagation with the direction of an aperture has been discussed (refer to, for example, Patent Documents 1 and 2).

FIG. 13 schematically shows an information recording/reproducing apparatus employing a near-field light utilization head assembly (head gimbal assembly) 100. The near-field light utilization head assembly 100 includes an optical fiber 103, a suspension arm 104, a flexure 105, a slider 106, and a near-field light generation element (not shown). The flexure 105 is formed at the distal end of the suspension arm 104 so that the slider 106 will float while being disposed at a certain position relative to the recording medium 107. At this time, a recording medium 107 is rotated at a high-speed with the slider 106, in which the near-field light generation element is mounted, approached to the surface of the recording medium 107 at a distance ranging from several nanometers to several tens of nanometers.

The suspension arm 104 is fixed to a voice coil motor (not shown) through a fixing hole 104a, and can be moved in a radial direction of the recording medium 107 by the voice coil motor. Herein, the slider 106 has the near-field light generation element disposed therein so that the near-field light generation element will be opposed to the recording medium 107. A light propagation unit that introduces a light beam emanating from a laser 101 into the slider 106 includes a lens 102 and the optical fiber 103 fixed to the suspension arm 104. If necessary, the light emanating from the laser 101 may be subjected to intensity modulation or the like by a circuit system 108.

In the foregoing near-field light utilization head assembly, when a force that presses the slider 106 toward the recording medium 107 and is imposed by the suspension arm 104 via the flexure 105, and a force that floats the slider 106 due to a wind pressure derived from the rotation of the recording medium 107 are balanced with each other, the slider 106 floats stably with a space, which ranges from several nanometers to several tens of nanometers, preserved relative to the recording medium 107. The suspension arm 104 is warped in advance toward the slider 106. With the spring force, a pressing force to be imposed on the slider 106 is generated. When the recording/reproducing apparatus operates, the warp of the suspension arm 104 is alleviated with a reactive force to the pressing force imposed on the slider 106.

DOCUMENT LIST

[Patent Document 1] The brochure of International Patent Publication No. 00/28536
[Patent Document 2] JP-A-2001-297463.

However, in the foregoing existing head gimbal assembly, the laser is disposed outside a suspension (for example, an arm bearing the suspension). Therefore, when the suspension and arm are assembled, a step of optically aligning the laser and optical waveguide (optical fiber) has to be followed. It is labor-intensive to thus align the laser and optical waveguide after assembling the suspension and arm. This poses a problem in that a cost of manufacture increases.

SUMMARY OF THE INVENTION

The present invention addresses the foregoing problems with the conventional art. An object of the present invention is to provide a head gimbal assembly with a light guide structure and an information recording/reproducing apparatus which make it possible to reduce manufacturing costs.

For solving the foregoing problems, a head gimbal assembly and information recording/reproducing apparatus according to the present invention are described below.

A head gimbal assembly with a light guide structure in accordance with the present invention is included in a rotary member borne to be turnable on a pivot shaft disposed outside magnetic recording media which are rotated in a certain direction. The head gimbal assembly includes a support borne by the rotary member, a slider attached to the distal end of the support so that the slider will be opposed to the surface of a magnetic recording medium, an optical waveguide that is coupled to the slider in order to introduce into the slider light with which the magnetic recording medium is heated, a light source that routes a light beam to the optical waveguide, and an electric wiring over which power is fed to the light source and slider. The head gimbal assembly is characterized in that the light source is disposed on the support.

In the head gimbal assembly with a light guide structure in accordance with the present invention, since the light source is disposed on the support, the necessity of aligning the light source after attaching the support to the rotary member is obviated. Specifically, when the support is attached to the rotary member, the alignment of the light source is already completed. Therefore, the efficiency of a manufacturing method is improved, and a cost of manufacture is reduced. In addition, since the light source can be disposed at a position closer to the slider than it can previously, a loss in an amount of light occurring through the optical waveguide is minimized, and optical efficiency is improved. Further, compared with a case where the light source is mounted in the slider, heat dissipation from the light source is readily achieved. Therefore, performance is reliably maintained.

In the head gimbal assembly with a light guide structure in accordance with the present invention, the rotary member includes an arm borne to be turnable on the pivot shaft, a base plate borne by the distal side of the arm, a hinge plate that is joined to the base plate and has an extension extended to the distal side of the base plate, and a load beam joined to the extension of the hinge plate. The support is joined to the load beam, and extended from a flexure on which the slider is disposed.

In the head gimbal assembly with a light guide structure in accordance with the present invention, a flexible printed circuit (FPC) board for feeding power to a magnetic element of the slider is formed on the flexure joined to the load beam included in the rotary member. The light source is disposed on the FPC board. Specifically, once the light source is disposed on the flexible printed circuit board, the head gimbal assembly is realized. Therefore, the head gimbal assembly is readily produced, and the cost of manufacture is reduced.

The head gimbal assembly with a light guide structure in accordance with the present invention is characterized in that the light source is a surface-emitting laser.

In the head gimbal assembly with alight guide structure in accordance with the present invention, a reflecting mirror is disposed at a desired position so that laser light can be reflected and introduced into the optical waveguide. In this state, once the surface-emitting laser is disposed to conduct over the electric wiring, once, the head gimbal assembly is realized. Mounting is easy to do, and a cost of manufacture is reduced.

The head gimbal assembly with a light guide structure in accordance with the present invention is characterized in that the light source is an edge-emitting laser.

In the head gimbal assembly with a light guide structure in accordance with the present invention, when the optical waveguide is connected to the end surface of the light source, laser light irradiated from the edge-emitting laser is directly introduced into the optical waveguide. Namely, a loss in an amount of light is minimized, and the laser light is efficiently introduced into the slider.

The head gimbal assembly with a light guide structure in accordance with the present invention is characterized in that the optical waveguide is formed with an optical fiber.

In the head gimbal assembly with a light guide structure in accordance with the present invention, laser light is efficiently introduced into the slider using the optical fiber. Mounting of the head gimbal assembly is facilitated.

The head gimbal assembly with a light guide structure in accordance with the present invention is characterized in that the optical waveguide has a core through which light advances. A section of the core lies in a direction orthogonal to the advancing direction of light. The section has a first axis that passes the center of the section and determines the width of the section, and a second axis that passes the center of the section and is orthogonal to the first axis. The first axis and second axis have mutually different lengths.

In the head gimbal assembly with a light guide structure in accordance with the present invention, light linearly polarized in a specific direction is fed to the slider. Namely, as long as the section of the core has a shape other than a square, while light is propagated through the core, the linearly polarized light is easily sustained.

The head gimbal assembly with a light guide structure in accordance with the present invention is characterized in that the section of the core is shaped like a rectangle that has the ratio of the first axis to the second axis set to 1.1 or more.

In the head gimbal assembly with alight guide structure in accordance with the present invention, light linearly polarized in a specific direction is fed to the slider. Namely, when the section of the core is shaped like a rectangle, if the rectangle is a flat shape that has the ratio of the first axis to the second axis set to 1.1 or more, while light is propagated through the core, the linearly polarized light is reliably sustained.

The head gimbal assembly with a light guide structure in accordance with the present invention is characterized in that the optical waveguide has a core through which light advances, and spaces are formed on the respective sides of the core.

In the head gimbal assembly with a light guide structure in accordance with the present invention, light linearly polarized in a specific direction is fed to the slider. Namely, once the spaces are formed on the respective sides of the core, while light is propagated through the core, the linearly polarized light is easily sustained.

The head gimbal assembly with a light guide structure in accordance with the present invention is characterized in that: the optical waveguide has a core through which light advances; and stress application sections for applying a stress in a direction in which the section of the core is compressed are formed on the respective sides of the core.

In the head gimbal assembly with a light guide structure in accordance with the present invention, light linearly polarized in a specific direction is fed to the slider. Namely, once the stress application sections are formed on the respective sides of the core, while light is propagated through the core, the linearly polarized light is easily sustained.

The head gimbal assembly with a light guide structure in accordance with the present invention is characterized in that: the optical waveguide has a core through which light advances, and a cladding that covers the core; and with a stress application member for applying a stress in a direction in which the section of the core is compressed is disposed on the surface of the cladding.

In the head gimbal assembly with a light guide structure in accordance with the present invention, light linearly polarized in a specific direction is fed to the slider. Namely, once the stress application member is disposed on the surface of the cladding that covers the core, while light is propagated through the core, the linearly polarized light is easily sustained.

An information recording/reproducing apparatus in accordance with the present invention includes the foregoing head gimbal assembly with a light guide structure, magnetic recording media rotated in a certain direction, a pivot shaft disposed outside the magnetic recording media, arms formed to be turnable on the pivot shaft, an actuator that bears the proximal sides of the arms, and moves the arms in a direction parallel to the surfaces of the magnetic recording media, a rotary drive unit that rotates the magnetic recording media in the certain direction, and a control unit that controls the actions of the slider and a light source.

In the information recording/reproducing apparatus in accordance with the present invention, since a cost of manufacture of the head gimbal assembly can be reduced, an information recording/reproducing apparatus that is low-cost and makes it possible to improve optical efficiency is provided.

According to the head gimbal assembly in which the present invention is implemented, since the light source is disposed on the support, the necessity of aligning the light source after attaching the support to the rotary member is obviated. In other words, when the support is attached to the rotary member, the alignment of the light source is already completed. Therefore, the efficiency of a manufacturing method is improved, and a cost of manufacture is reduced. Since the light source is located at a position closer to the slider than previously done, a loss in an amount of light occurring through the optical waveguide is minimized, and optical efficiency is improved. Further, compared with a case where the light source is mounted in the slider, heat dissipation from the light source is readily achieved. Therefore, performance is reliably maintained.

BEST MODE FOR CARRYING OUT THE INVENTION (First Embodiment)
(Information Recording/Reproducing Apparatus)

Figure 1:
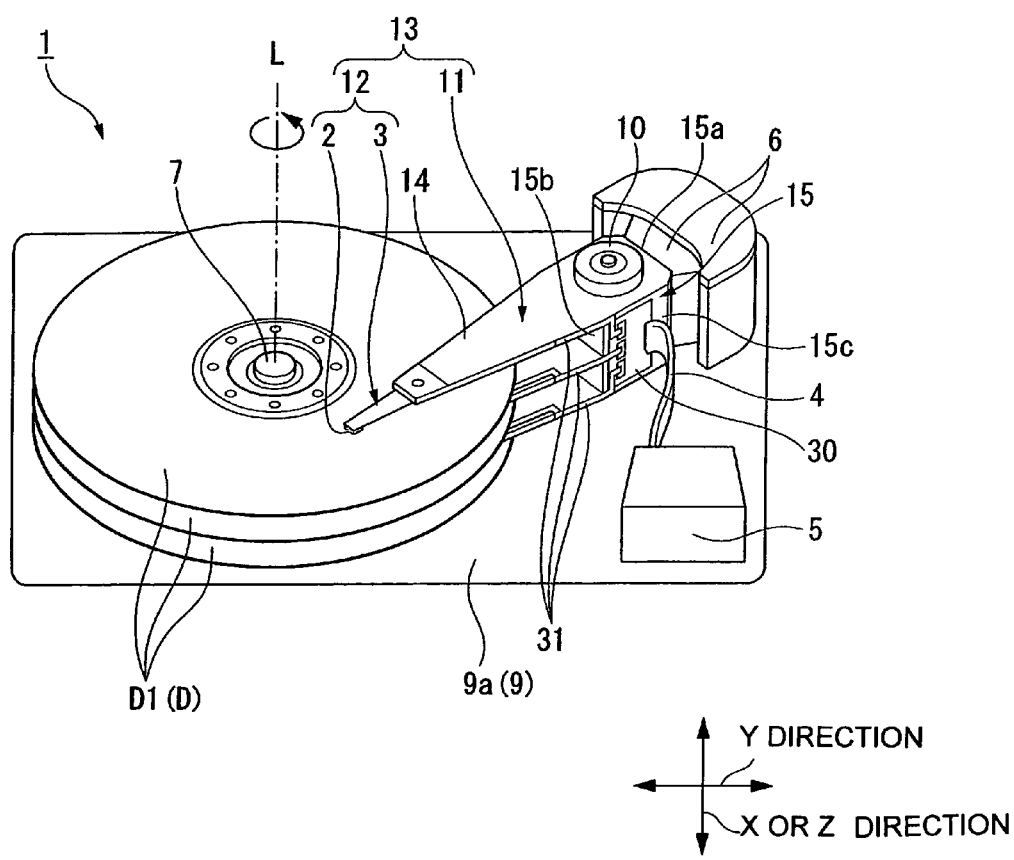
FIG. 1 is a schematic construction diagram of an information recording/reproducing apparatus in accordance with an embodiment of the present invention.

Referring to FIG. 1 to FIG. 11, the first embodiment of the present invention will be described below. FIG. 1 is a schematic construction diagram of an information recording/reproducing apparatus 1 in accordance with the present invention. The information recording/reproducing apparatus 1 of the present embodiment is an apparatus that writes data in disks (magnetic recording media) D, each of which has a perpendicular recording layer, according to a perpendicular recording method.

As shown in FIG. 1, the information recording/reproducing apparatus 1 includes carriage 11, head gimbal assemblies (HGAs) 12 borne by the distal sides of the carriage 11, electric wirings 31 extended from the proximal sides of the carriage 11 toward the head gimbal assemblies (HGAs) 12, an actuator 6 that moves the head gimbal assemblies 12 in an XY-plane direction parallel to a disk surface D1 (surfaces of disks D) for the purpose of scanning, a spindle motor 7 that rotates the disks D with a rotation shaft L as a center, a control unit 5 that feeds a current, which is modulated based on information, to sliders 2 of the head gimbal assemblies 12, and a housing 9 that accommodates these components.

The housing 9 is shaped like a box that is made of a metallic material such as aluminum and has an upper aperture. The housing 9 includes a bottom 9a that is shaped like a quadrangle when seen from above, and peripheral walls (not shown) that are constructed on the perimeter of the bottom 9a in a vertical direction relative to the bottom 9a. A concave part in which the components are stored is formed inside the peripheral walls. In FIG. 1, for a better understanding, the peripheral walls forming the periphery of the housing 9 are not shown.

To the housing 9, a lid that is not shown is detachably attached in order to block the aperture of the housing 9. The spindle motor 7 is disposed substantially in the center of the bottom 9a in a planar state, and disks D are detachably attached to the spindle motor 7 that is fitted into the center holes of the disks D.

The actuator 6 is disposed at one corner of the bottom 9a outside the disks D. The carriage 11 that is turnable in an XY-plane direction with the pivot shaft 10 as a center is attached to the actuator 6. The carriage 11 has arms 14, which are extended from the proximal end of the carriage to the distal end thereof (toward the disk D), and a proximal part 15, which cantilevers the arms 14 at the proximal end of the carriage, formed as a united body through carving machining or the like. The proximal part 15 is shaped substantially like a cuboid and is borne to be turnable with the pivot shaft 10 as a center. In other words, the proximal part 15 is joined to the actuator 6 via the pivot shaft 10, and the pivot shaft 10 is the turning center of the carriage 11.

Each of the arms 14 is shaped like a flat plate that extends from a side surface (opposed to the corner of the bottom) 15b, which is opposite to a side surface 15a of the proximal part 15 to which the actuator 6 is attached, in parallel with the direction of the upper surface (an XY-plane direction) of the proximal part 15. Three arms are extended substantially equidistantly in the height direction (Z direction) of the proximal parts 15. More particularly, the arms 14 are tapered to get thinner from the proximal ends of the carriage to the distal ends thereof, and the disks D are sandwiched among the arms 14. In other words, the arms 14 and disks D are alternately arranged. When driven by the actuator 6, the arms 14 can be moved in the direction (XY-plane direction) parallel to the surfaces of the disks D.

In the present embodiment, the carriage 11 and head gimbal assembly 12 constitute a rotary member 13. When the rotations of the disks D are ceased, the rotary members 13 are driven by the actuator 6 to recede from the disks D. The rotary member 13 may be formed with the head gimbal assembly 12 alone.

The light source 20 of the head gimbal assembly 12 emits a light beam that is introduced into the slider 2 thereof having a near-field light generation element, which is not shown, so that the slider will generate near-field light (spotlight). The near-field light is used to record or reproduce various kinds of pieces of information in or from the disk D. The near-field light generation element is formed with, for example, an optically microscopic aperture or a projection whose size is on the order of nanometers.

Figure 2:
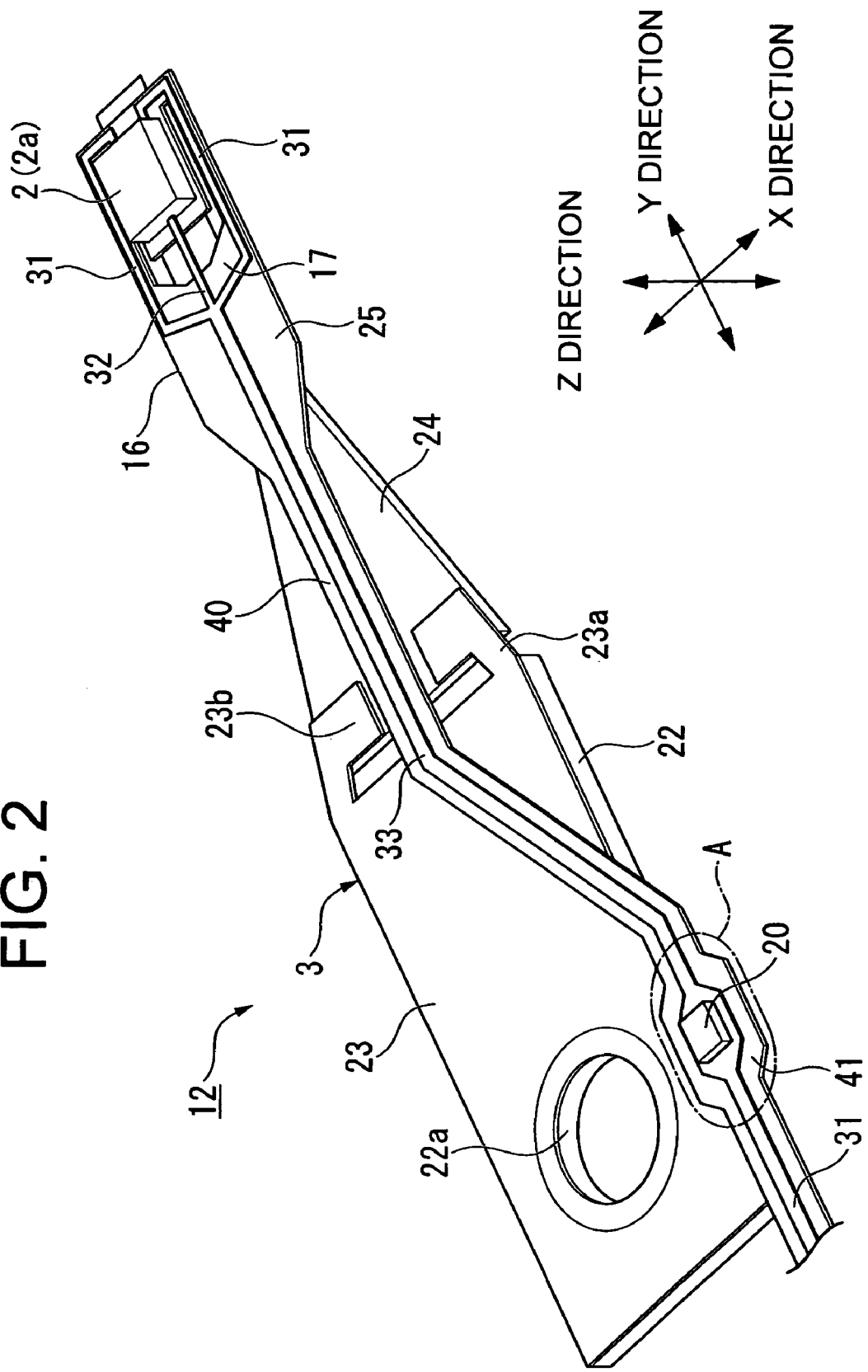
FIG. 2 is a perspective view (back side) of a head gimbal assembly in accordance with the first embodiment of the present invention.
Figure 3:
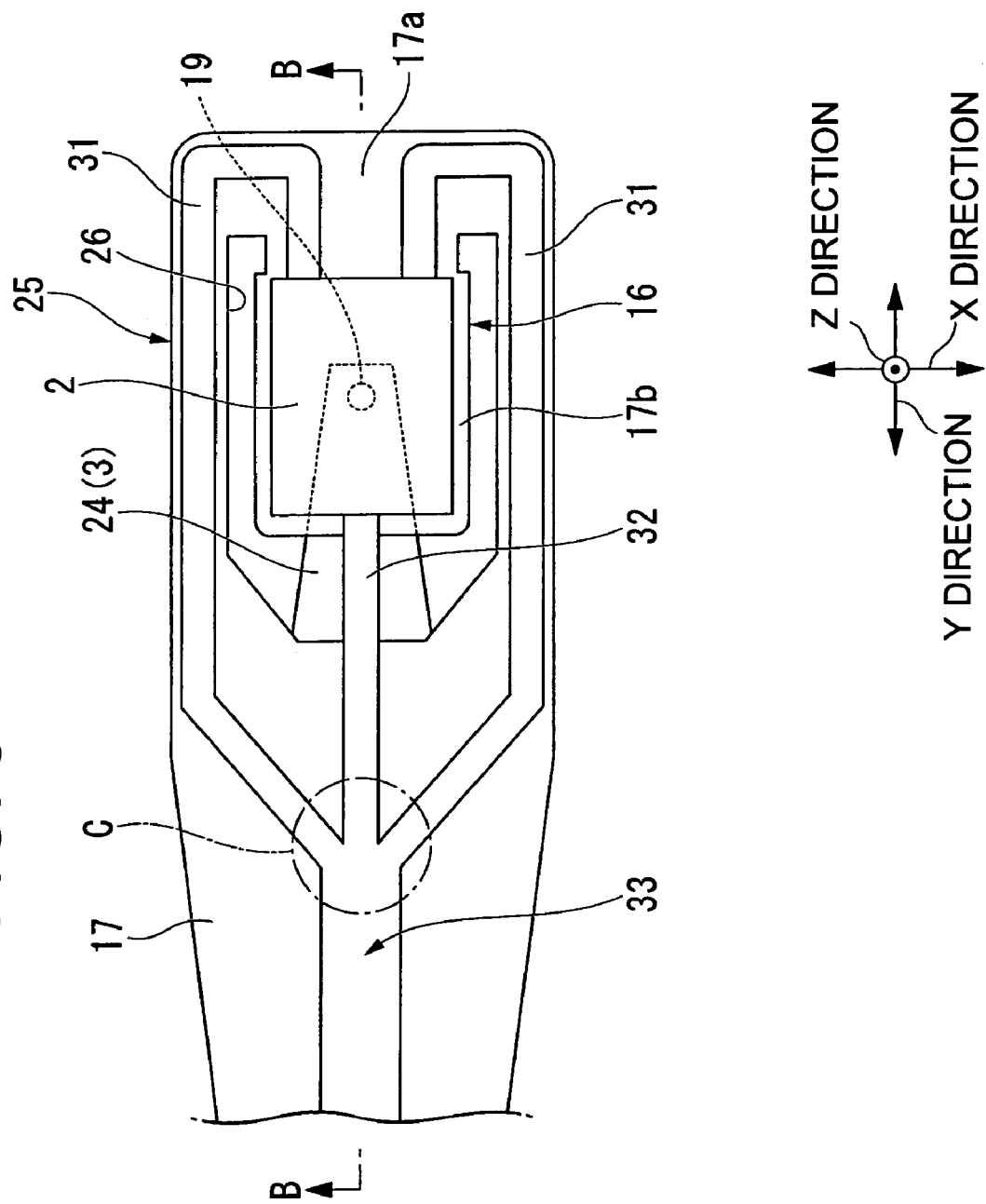
FIG. 3 is a plan view of gimbal included in the first embodiment of the present invention.
Figure 4:
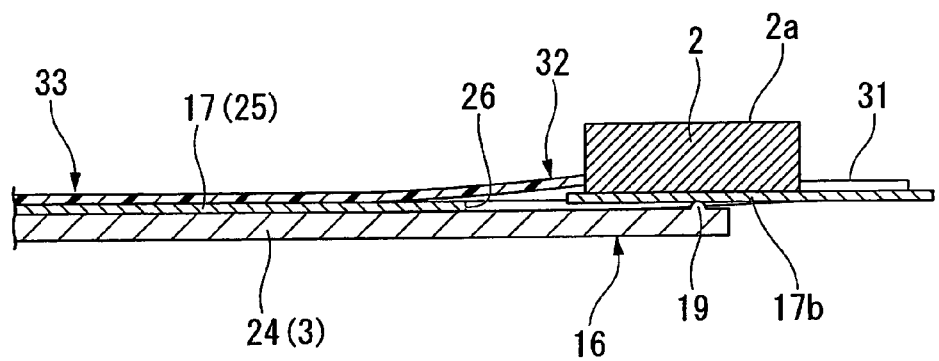
FIG. 4 is a sectional view of the gimbal along a B-B cutting-plane line shown in FIG. 3.

FIG. 2 is a perspective view in which the head gimbal assembly 12 is seen from the side of the slider 2 with the slider 2 oriented upward. FIG. 3 is a plan view in which gimbal 17 is seen with the slider 2 oriented upward. FIG. 4 is a sectional view of the distal end of a suspension 3 along a B-B cutting-plane line shown in FIG. 3 with the slider 2 oriented upward.

As shown in FIG. 2, the head gimbal assembly 12 functions as a suspension allowing the slider 2 to float above the disk D. The head gimbal assembly 12 includes the slider 2, the suspension 3 that is made of a metallic material, formed like a thin plate, and movable in the XY-plane direction parallel to the disk surface D1, an optical waveguide 32 coupled to the slider 2, and the laser light source 20 that routes a light beam to the optical waveguide 32. The suspension 3 includes a gimbal means 16 which secures the slider 2 on the lower surface of the suspension 3 so that the slider 2 can be turned about two axes (X axis and Y axis) which are orthogonal to each other and parallel to the disk surface D1, that is, the slider 2 can be twisted with each of the two axes as a center.

The slider 2 is borne by the lower surface of the suspension 3 with the gimbal 17, which will be described later, between them, and is interposed between the disk D and suspension 3. The slider 2 includes a reproduction element (not shown) fixed to the distal side thereof, and a recording element (not shown) fixed adjacently to the reproduction element. The slider 2 further has a condenser lens (optical system), which condenses a light beam emitted from the laser light source 20 and is not shown, and the near-field light generation element, which generates near-field light using the light beam condensed by the condenser lens, disposed to be opposed to the reproduction element with the recording element between them. In other words, the slider 2 has the reproduction element, recording element, and near-field light generation element juxtaposed at the distal end thereof.

The lower surface of the slider 2 is a floating surface 2a opposed to the disk surface D1. The floating surface 2a generates a pressure, which is necessary for floating, from the viscosity of an air flow caused by the rotating disk D, and is called an air bearing surface (ABS). More particularly, the floating surface is designed so that the slider 2 will be floated in an optimal state by adjusting a positive pressure, which causes the slider 2 to recede from the disk surface D1, and a negative pressure which causes the slider 2 to approach to the disk surface D1.

The slider 2 is applied a force, which causes the slider to float above the disk surface D1, by the floating surface 2a, and is applied a force, which presses the slider against the disk D, by the suspension 3. The slider 2 floats above the disk surface D1 with the forces balanced.

The suspension 3 includes a base plate 22 formed substantially like a quadrangle in a planar state, a hinge plate 23 that is attached to the back surface (lower surface) of the base plate 22 and formed to have the distal end thereof extended from the base plate 22, and a load beam 24 that is shaped substantially like a triangle in a planar state and joined to the extension of the hinge plate 23.

The base plate 22 is made of a metallic material such as a stainless steel, is formed to be thin, and has an aperture 22a, which penetrates in a thickness direction, formed at the proximal end thereof. Through the aperture 22a, the base plate 22 is fixed to the distal end of the arm 14. The sheet-like hinge plate 23 made of a metallic material such as a stainless steel is disposed on the lower surface of the base plate 22. The hinge plate 23 is shaped like a flat plate and disposed on the entire lower surface of the base plate 22. The distal part of the hinge plate 23 is formed as extensions 23a that extend in the longitudinal direction of the base plate 22 from the distal end of the base plate 22. The extensions 23a are two extensions extending from the respective ends of the hinge plate 23 in the width direction thereof, and have the widths thereof expanded as expanded parts 23b inwardly in the width direction, that is, toward the opposite extensions 23a. The load beam 24 is joined to the upper surfaces of the expanded parts 23b.

The load beam 24 is, similarly to the base plate 22, made of a metallic material such as a stainless steel and formed to be thin. The proximal end of the load beam is joined to the hinge plate 23 with a space preserved between the proximal end thereof and the distal end of the base plate 22. Therefore, the hinge plate 23 is likely to flex between the base plate 22 and load beam 24 and deflect in the Z direction perpendicular to the disk surface D1. Namely, the extensions 23a of the hinge plate 23 are designed to bend.

A flexure 25 is disposed on the distal side of the load beam 24. The flexure 25 is made of a metallic material such as a stainless steel, and formed like a sheet so that the flexure can flex or deform in the thickness direction. The flexure 25 is fixed to the distal side of the load beam 24, and includes the gimbal 17 shaped substantially like a hexagon when seen from above.

As shown in FIG. 3 and FIG. 4, the gimbal 17 is formed so that the portion thereof ranging from the vicinity of the middle thereof to the distal end thereof will slightly warp in the thickness direction toward the disk surface Dl. The portion of the gimbal 17 ranging from the proximal side thereof to the substantial middle thereof is fixed to the load beam 24 to prevent the warped distal side of the gimbal from coming into contact with the load beam 24.

On the distal side of the gimbal 17 being floated, a notched part 26 having the perimeter thereof notched in the shape of a bracket is formed. A pad portion (tongue piece) 17b supported in a cantilevered manner by a joint 17a is formed while being surrounded by the notched part 26. In other words, the pad portion 17b is formed to project from the distal side of the gimbal 17 to the proximal side thereof owing to the joint 17a, and is surrounded by the notched part 26. Therefore, the pad portion 17b is likely to flex in the thickness direction of the gimbal 17, and has the angle thereof adjusted so that the pad portion 17b alone will be parallel with the lower surface of the suspension 3. The slider 2 is mounted and secured on the pad portion 17b. Namely, the slider 2 is hung on the load beam 24 via the pad portion 17b.

A projection 19 that juts toward the substantial center of the pad portion 17b and slider 2 is formed in the distal end of the load beam 24. The tip of the projection 19 is rounded. When the slider 2 is floated toward the load beam 24 due to a wind pressure applied by the disk D, the projection 19 comes into point contact with the front surface (upper surface) of the pad portion 17b. The floating force is conveyed from the projection 19 to the load beam 24, and acts on the load beam 24 to flex the load beam 24. When a wind pressure oriented in the XY-plane direction is applied to the slider 2 due to the surge of the disk D or the like, the slider 2 and pad portion 17b are twisted about the two axes of the X axis and Y axis with the projection 19 as a center. Therefore, a displacement in the Z direction derived from the surge of the disk D (a displacement in a direction substantially orthogonal to the disk surface D1) can be absorbed, and the posture of the slider 2 is stabilized.

The gimbal 17 including the projection 19 and pad portion 17b constitute the gimbal means 16.

Referring back to FIG. 2, a support 40 extending toward the proximal part 15 is formed on the flexure 25. The support 40 is shaped like a sheet as an integral part of the gimbal 17, and extended toward the proximal part 15 along the suspension 3. When the suspension 3 is deformed, the support 40 follows the deformation of the suspension 3. The support 40 is laid on the upper surface of the arm 14, and led to the proximal part 15 joined to the arm 14 along the side surface of the arm 14. Further, the support 40 is partly bent to prevent it from passing across the aperture 22a of the base plate 22, and is extended toward the proximal part 15. A photoelectric complex wiring 33 having the electric wiring 31 and optical waveguide 32 integrated thereinto and the laser light source 20 are borne by the support 40. Thus, the laser light source 20 is disposed on the support 40 mounted on the suspension 3. Therefore, alignment of the light source can be achieved during manufacture of the suspension 3.

The photoelectric complex wiring 33 is bifurcated into the optical waveguide 32 and electric wiring 31 in the vicinity of the distal end of the flexure 25. The optical waveguide 32 and electric wiring 31 are coupled to the slider 2. The optical waveguide 32 is extended from the laser light source 20 in a longitudinal direction as it is, and is coupled to the slider 2. The electric wiring 31 is extended from the photoelectric complex wiring 33 in oblique directions, disposed along the perimeter of the gimbal 17, and coupled to the slider 2 in the direction of the joint 17a.

Figure 5:
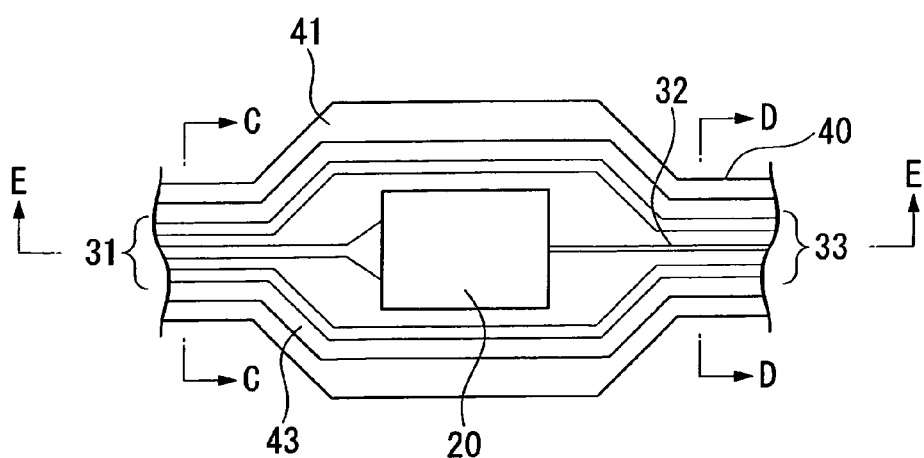
FIG. 5 is an enlarged diagram (plan view) of part A shown in FIG. 2.
Figure 6:
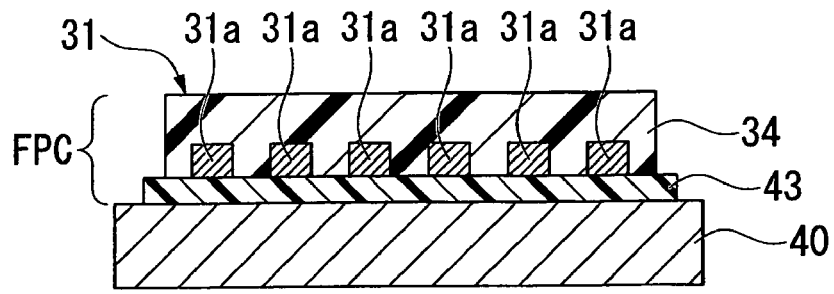
FIG. 6 is a sectional view of part A along a C-C cutting-plane line shown in FIG. 5.
Figure 7:
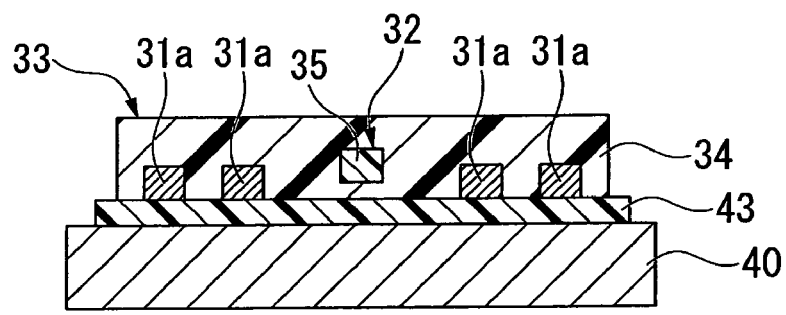
FIG. 7 is a sectional view of part A along a D-D cutting-plane line shown in FIG. 5.
Figure 8:
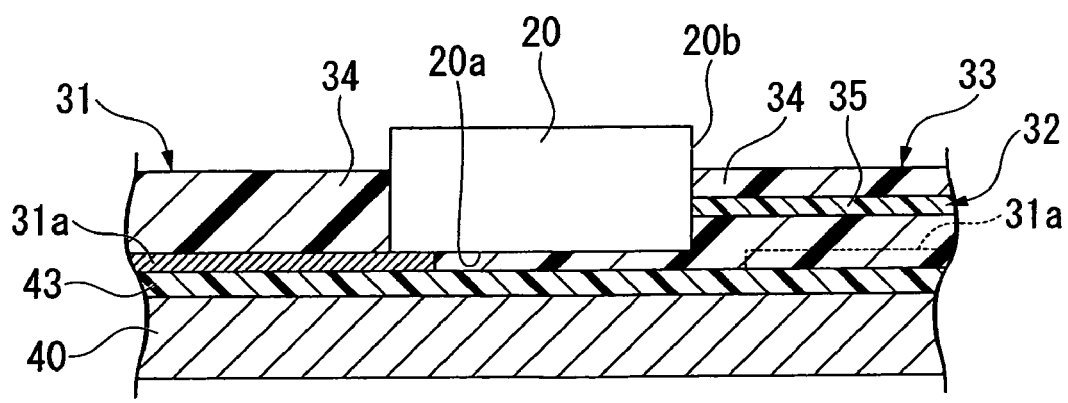
FIG. 8 is a sectional view of part A along an E-E cutting-plane line shown in FIG. 5.

Next, the laser light source 20 will be described below. FIG. 5 is an enlarged plan view of part A shown in FIG. 2. FIG. 6 is a sectional view of part A along a C-C cutting-plane line shown in FIG. 5. FIG. 7 is a sectional view of part A along a D-D cutting-plane line shown in FIG. 5. FIG. 8 is a sectional view of part A along an E-E cutting-plane line shown in FIG. 5.

As shown in FIG. 5, in a place on the support 40 in which the laser light source 20 is disposed, an expanded part 41 that is expanded in a direction orthogonal to the longitudinal direction in a planar state is formed. A base coat 43 having an insulating property is formed on the surface of the support 40. The electric wiring 31 and photoelectric complex wiring 33 are formed on the base coat 43.

As shown in FIG. 6, in the present embodiment, the electric wiring 31 is extended from a terminal substrate 30 disposed in the proximal part 15 of the carriage 11. The electric wiring 31 is laid on the front surface of the terminal substrate 30, run along the side surface of the arm 14, and led to the support 40. The electric wiring 31 includes six electric lines 31a. Among the six electric lines, two electric lines are coupled to the laser light source 20, and the four remaining electric lines are coupled to the slider 2. The six electric lines 31a are covered with a cladding (coating) 34. Namely, the six electric lines 31a are formed as a united body within the range from the proximal ends thereof to the distal ends thereof between the terminal substrate 30 and laser light source 20. Thus, the electric wiring 31 is formed on the flexible and deformable support 40. Therefore, when the slider 2 moves or the suspension 3 deforms, the electric wiring deforms together with the support 40. Therefore, a disconnection of the electric wiring 31 can be prevented.

As shown in FIG. 7, between the laser light source 20 and slider 2, the four electric lines 31a and the optical waveguide 32 that introduces light emitted from the laser light source 20 into the slider 2 are formed. The four electric lines 31a and optical waveguide 32 constitute the photoelectric complex wiring 33. The electric lines 31a and optical waveguide 32 are covered with the cladding 34. Specifically, the optical waveguide 32 and four electric lines 31a coupled to the slider 2 are formed as a united body in the range from the proximal ends thereof to the distal ends thereof between the laser light source 20 and the vicinity of the slider 2. Thus, since the photoelectric complex wiring 33 is formed on the flexible or deformable support 40, when the slider 2 moves or the suspension 3 deforms, the photoelectric complex wiring 33 deforms, similarly to the electric wiring 31, together with the support 40. Therefore, a disconnection of the photoelectric complex wiring 33 can be prevented.

The optical waveguide 32 included in the photoelectric complex wiring 33 has a thickness ranging from, for example, 3 μm to 10 μm. The optical waveguide 32 has a core 35 that introduces a light beam emitted from the laser light source 20 under a condition of total reflection, and the cladding 34 that has a thickness of, for example, several tens of micrometers, is made of a material whose refractive index is lower than the reflective index of the core 35, and seals the core 35 while being in close contact with the core 35. The light beam emitted from the laser light source 20 is introduced into the condenser lens of the slider 2 under the condition of total reflection due to the difference in the refractive index between the core 35 and cladding 34.

An example of a combination of materials to be made into the cladding 34 and core 35 respectively is conceivably such that the core whose thickness ranges from 3 μm to 10 μm is made of a polymethyl methacrylate (PMMA) resin, and the cladding having a thickness of several tens of micrometers is made of a fluorine-containing polymer. The core and cladding may be made of an epoxy resin (for example, the refractive index for the core ranges from 1.522 to 1.523, and the refractive index for the cladding ranges from 1.518 to 1.519), or fluorinated polyimide. The larger the difference in the refractive index between the core and cladding is, the larger a force of confining a light beam to the core is. Therefore, the difference in the refractive index between the core and cladding is preferably increased by adjusting the proportion of the components of the resin material made into each of the core and cladding. For example, in the case of fluorinated polyimide, the refractive index may be controlled by adjusting the content of fluorine or irradiating energy such as radiant light.

The electric lines 31a are made of aluminum or copper, and confined to the cladding 34 together with the core 35.

When a resin material is adopted as a material for the optical waveguide 32 included in the photoelectric complex wiring 33, the photoelectric complex wiring 33 can be manufactured according to a semiconductor fabrication process.

A manufacturing method for the photoelectric complex wiring 33 employed in the present embodiment which utilizes the semiconductor fabrication process will be more practically described below. To begin with, a base coat 43 being made of polyimide or the like and having an insulating property is formed on the support 40. After a material to be made into the cladding 34 is applied to the base coat 43, patterning is performed using a photolithographic technology or the like. Thereafter, a material to be made into the electric lines 31a is used to form a film on the cladding 34 according to a sputtering method, a chemical vapor deposition (CVD) method, or the like. The film is patterned to produce the multiple electric lines 31a. After a material to be made into the core 35 is applied to the middle of the electric lines 31a, that is, to the center of the YZ plane of the cladding 34, the material is patterned. Thereafter, the material to be made into the cladding 34 is applied again. Thereafter, patterning is performed in order to produce the photoelectric composite wiring 33 employed in the present embodiment.

As mentioned above, since the optical waveguide 32 and electric lines 31a are formed as a united body using the cladding 34 made of a resin material, these elements can be fabricated comprehensively according to the semiconductor fabrication process. Since the semiconductor fabrication process is used to manufacture the photoelectric composite wiring 33, compared with a case where the optical waveguide 32 and electric lines 31a are produced mutually separately, manufacturing efficiency can be improved owing to the easiness in mass-production, and machining precision can be improved at the same time. In addition, a cost of manufacture can be reduced.

As shown in FIG. 7, the photoelectric composite wiring 33 has the core 35 of the optical waveguide 32 disposed in the center in the width direction (YZ plane) of the cladding 34 which is the center of a section of the cladding, and has the electric lines 31a disposed in twos on both sides of the optical waveguide 32 so that the pairs of electric lines 31a will sandwich the optical waveguide 32. Namely, the photoelectric composite wiring 33 is symmetric with the core 35 as a center. The core 35 and electric lines 31a are sealed by the cladding 34, whereby the photoelectric composite wiring 33 having the optical waveguide 32 and electric lines 31a integrated thereinto is formed.

Referring back to FIG. 3, the photoelectric composite wiring 33 is bifurcated into the electric wiring 31 and optical waveguide 32 at the distal end of the suspension 3, or more particularly, at the middle of the gimbal 17. More particularly, the optical waveguide 32 is extended in the longitudinal direction of the gimbal 17 from the bifurcate point C on the distal side of the photoelectric composite wiring 33, and is directly coupled to the proximal side of the slider 2 while being crossed over the notched part 26 of the gimbal 17. The optical waveguide 32 is separated from the lower surface of the gimbal 17 at the bifurcate point C of the photoelectric composite wiring 33, and is extended from the bifurcate point C to the proximal side of the slider 2 while being slightly floated as if to span the pad portion 17b and gimbal 17. In other words, on the lower surface of the gimbal 17, the optical waveguide 32 is led to the proximal side of the slider 2 while being substantially linearly extended (a radius of curvature is substantially infinite). The optical waveguide 32 led to the proximal side of the slider 2 is coupled to the near-field light generation element located on the distal side of the slider 2 via the condenser lens within the slider 2.

At the bifurcate point C, the electric wiring 31 is bent toward the external-circumference portion of the gimbal 17, and passed along the external-circumference portion of the gimbal 17, that is, the external side of the notched part 26. The electric wiring 31 passed along the external side of the notched part 26 passes over the joint 17a, and is coupled to the distal side of the slider 2. Specifically, the electric wiring 31 is directly coupled to the reproduction element and recording element, which are located on the distal side of the slider 2, from outside the slider 2.

As shown in FIG. 8, the electric lines 31a are electrically coupled to the bottom 20a of the laser light source 20 using solder or the like. The laser light source 20 employed in the present embodiment is formed with an edge-emitting laser. The optical waveguide 32 is coupled to the side surface 20b of the laser light source 20. Light emitted from the laser light source 20 is advanced through the core 35 of the optical waveguide 32, and is introduced into the slider 2.

Figure 9:
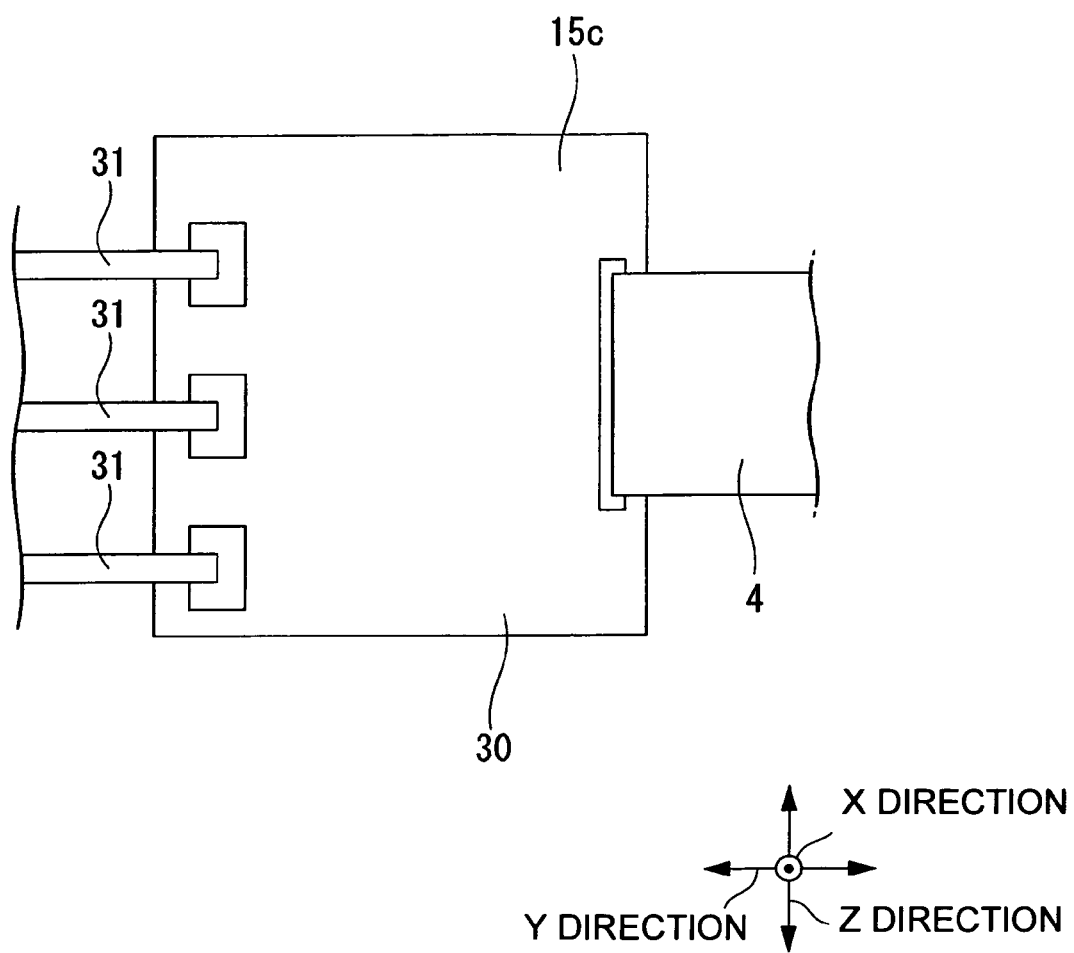
FIG. 9 is a side view of a proximal part included in the embodiment of the present invention.

FIG. 9 is a side view of the proximal part 15 of the carriage 11.

As shown in FIG. 1 and FIG. 9, the terminal substrate 30 is disposed on the side surface 15c of the proximal part 15 of the carriage 11. The terminal substrate 30 serves as a relay point between electric connections of the control unit 5 stored in the housing 9 to the slider 2 and laser light source 20. Various kinds of control circuits (not shown) are formed on the front surface of the terminal substrate 30. The control unit 5 and terminal substrate 30 are electrically connected to each other over a flexible flat cable 4, while the terminal substrate 30 and slider 2 are connected to each other over the electric wiring 31. The number of electric wirings 31 corresponds to the number of sliders 2 associated with the carriage 11. A signal sent from the control unit 5 over the flat cable 4 is outputted to the slider 2 and laser light source 20 over the electric wiring 31.

Next, a procedure of recording or reproducing various kinds of pieces of information in or from the disk D in the information recording/reproducing apparatus 1 having the foregoing components will be described below.

To begin with, the spindle motor 7 is driven to rotate the disks D in a predetermined direction. Thereafter, the actuator 6 is started in order to turn the carriage 11 with the pivot shaft 10 as a turning center. The head gimbal assembly 12 is swept in the XY-plane direction via the carriage 11. Thus, the slider 2 is located at a desired position on the disk D.

Since the proximal part 15 of the carriage 11 is designed to be able to turn about the pivot shaft 10, the arm 14 moves in a direction parallel to the disk surface D1 with the pivot shaft 10 as the turning center.

Thereafter, a light beam emanating from the laser light source 20 is routed to the optical waveguide 32, and introduced into the slider 2. The laser light source 20 that feeds the light beam to the condenser lens of the slider 2 is disposed on the support 40 mounted on the suspension 3. At this time, the light beam to be propagated into the interior of the optical waveguide 32 is condensed by the condenser lens in the slider 2, and has a spot size thereof gradually diminished. Eventually, near-field light is generated around the near-field light generation element as if to ooze out.

The disk D to which near-field light is routed is locally heated by the near-field light, and has the coercive force thereof temporarily lowered. When a current is fed to the recording element of the slider 2 by the control unit 5, a recording magnetic field oriented in a perpendicular direction is generated in the disk D due to the principles of electromagnets. As a result, information is recorded according to a hybrid magnetic recording method of allowing the near-field light to collaborate with the recording magnetic field generated by the recording element.

In contrast, when information recorded in the disk D is reproduced, the reproduction element fixed adjacently to the recording element is affected by a magnetic field leaking out from the disk D, and an electric resistance is varied depending on the magnitude of the magnetic field. Therefore, a voltage at the reproduction element is varied. Accordingly, the control unit 5 detects the variation in the magnetic field, which has leaked out from the disk D, as a variation in the voltage. The control unit 5 reproduces a signal on the basis of the variation in the voltage, and thus reproduces the information. Thus, various kinds of pieces of information can be recorded or reproduced in or from the disk D by utilizing the slider 2.

The slider 2 is supported by the suspension 3 and pressed against the disk D by a predetermined force. At the same time, since the floating surface 2a of the slider 2 is opposed to the disk D, the slider 2 is affected by a wind pressure caused by the rotating disk D, that is, affected by a floating force. When both the forces are balanced, the slider 2 is floated to lie apart from the disk D.

Since the slider 2 is pressed toward the suspension 3 by the wind pressure, the pad portion 17b included in the gimbal 17 in order to secure the slider 2, and the projection 19 formed on the suspension 3 come into point contact with each other. The floating force is conveyed to the suspension 3 via the projection 19, and acts on the suspension 3 so that the suspension 3 will be flexed in the Z direction perpendicular to the disk surface D1. Therefore, the slider 2 is floated as mentioned above. Incidentally, since the base plate 22 and load beam 24 are joined to the suspension 3 via the hinge plate 23, the suspension 3 is likely to flex between the base plate 22 and load beam 24.

Even when the slider 2 is affected by a wind pressure derived from the surge of the disk D (a wind pressure oriented in the XY-plane direction), the slider 2 is twisted about the X and Y axes via the gimbal means 16, that is, the pad portion 17b brought into point contact with the tip of the projection 19. Therefore, a displacement in the Z direction derived from the surge can be absorbed, and the posture of the floating slider 2 can be stabilized.

According to the present embodiment, since the laser light source 20 is disposed on the support 40 borne by the rotary member 13 (carriage 11 and head gimbal assembly 12), the necessity of aligning the light source after attaching the suspension 3 to the arm 14, which is previously needed, is obviated. Specifically, when the suspension 3 is attached to the arm 14, the alignment of the light source is already completed. Therefore, efficiency in production of the head gimbal assembly 12 can be improved, and a cost of manufacture can be reduced. In addition, since the laser light source 20 can be located at a position closer to the slider 2 than it can previously, a loss in an amount of light occurring through the optical waveguide 32 can be minimized, and optical efficiency can be improved. Further, compared with a case where the laser light source 20 is mounted in the slider 2, heat dissipation from the light source is readily achieved. Eventually, performance is reliably maintained.

The flexible printed circuit (FPC) board for feeding power to the magnetic element of the slider 2 is formed on the flexure 25 (support 40) joined to the load beam 24 included in the rotary member 13, and the laser light source 20 is disposed on the FPC board. Namely, once the laser light source 20 is disposed on the FPC board, the head gimbal assembly is realized. Therefore, a desired head gimbal assembly 12 can be constructed easily, and a cost of manufacture can be reduced.

Since an edge-emitting laser is adopted as the laser light source 20, once the optical waveguide 32 is coupled to the side surface 20b of the laser light source 20, laser light irradiated from the edge-emitting laser can be directly introduced into the optical waveguide 32. In other words, a loss in an amount of light can be minimized, and laser light can be efficiently introduced into the slider.

Since the information recording/reproducing apparatus 1 employs the foregoing head gimbal assembly 12, the information recording/reproducing apparatus can be produced at a low cost. In addition, optical efficiency can be improved.

Figure 10:
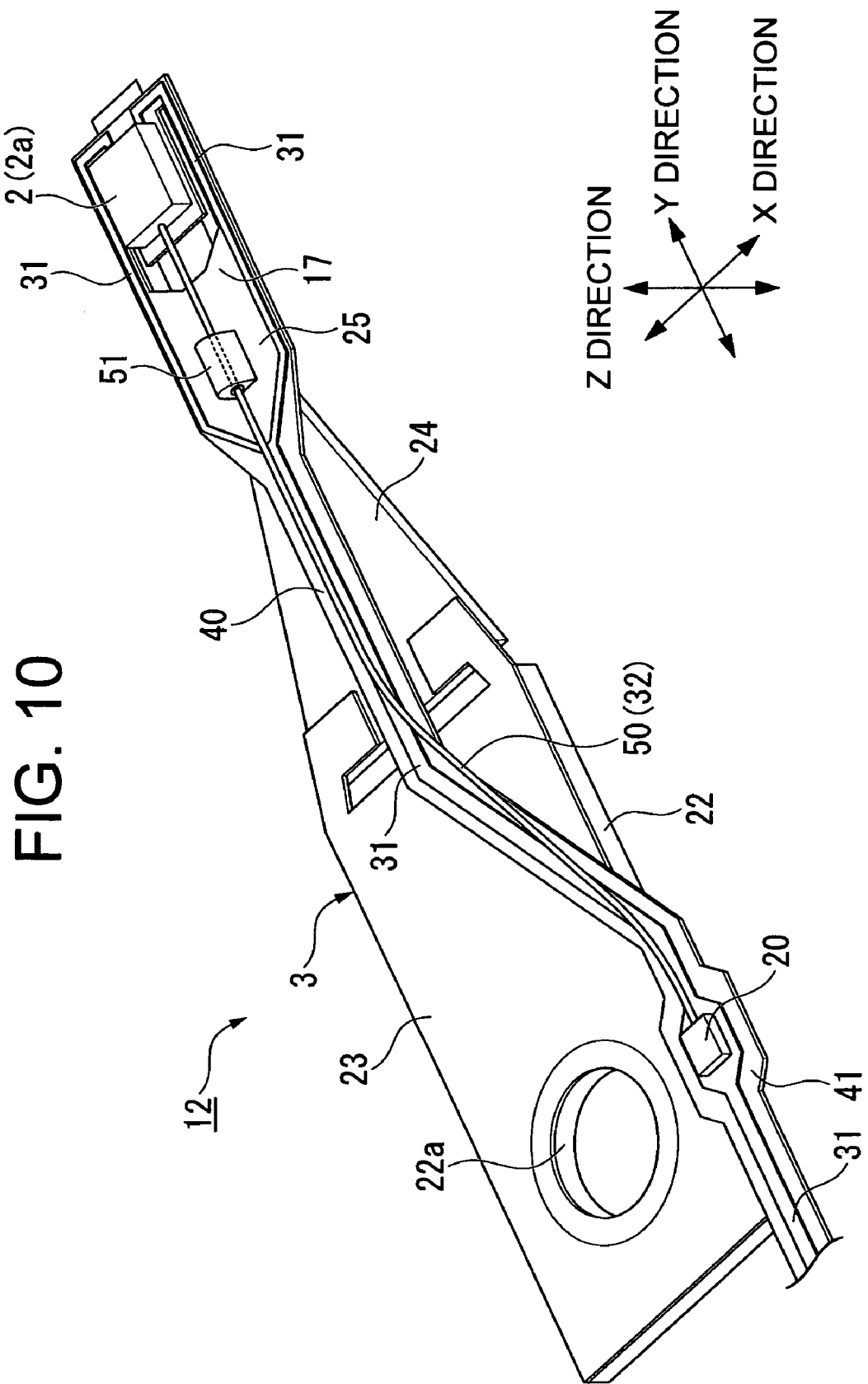
FIG. 10 is a perspective view (back side) showing another form of the head gimbal assembly in accordance with the first embodiment of the present invention.
Figure 11:
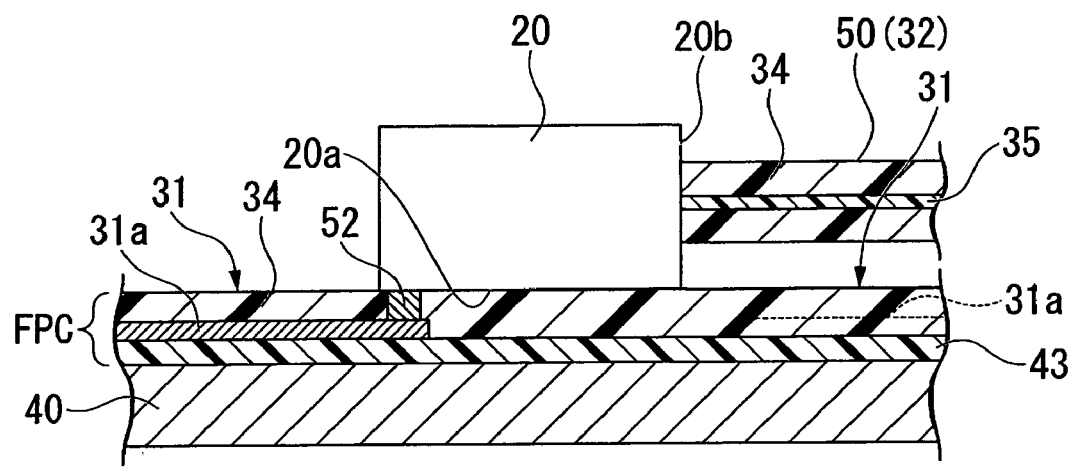
FIG. 11 is a partial sectional view (equivalent to the sectional view along the E-E cutting-plane line shown in FIG. 5) showing another form of the head gimbal assembly in accordance with the first embodiment of the present invention.

Unlike the foregoing embodiment, the optical waveguide 32 may not be, as shown in FIG. 10 and FIG. 11, included in the photoelectric composite wiring 33 but may be laid down independently of the photoelectric composite wiring 33. An optical fiber 50 including a core and a cladding may be adopted as the optical waveguide 32. An example of materials to be used for the optical waveguide 32 is conceivably such that, for example, the core is made of silica (silicon dioxide ($SiO_2$)) and the cladding is made of silica doped with fluorine. This example is preferable because when the wavelength of a light beam is 400 nm, the refractive index of the core is 1.47, and the refractive index of the cladding falls below 1.47. Another conceivable example is such that the core is made of silica doped with germanium and the cladding is made of silica. This example is also preferable because when the wavelength of a light beam is 400 nm, the refractive index of the core is larger than 1.47 and the refractive index of the cladding is 1.47. In particular, the larger the difference in the refractive index between the core and cladding is, the larger a force confining the light beam to the core is. Therefore, preferably, the core is made of tantalum oxide ($Ta_2O_5$) (when the wavelength is 550 nm, the refractive index is 2.16), and the cladding is made of silica or the like. Thus, the difference in the refractive index between the core and cladding should be increased. When a light beam in the infrared region is utilized, the adoption of silicon (Si) (the refractive index is approximately 4.0), which is a material transparent to infrared light, as the material of the core would prove effective.

When the optical fiber 50 is adopted as the optical waveguide 32, laser light can be efficiently introduced into the slider 2. In addition, mounting can be readily achieved. When the optical fiber 50 is employed, a supporting member 51 may be disposed on the flexure 25 so as to support the optical fiber 50 in order to prevent the optical fiber 50 from flexing.

For electrically coupling the electric lines 31a to the laser light source 20, the electric lines 31a may be coupled directly to the laser light source 20 through solder joint in the same manner as it is in the aforesaid embodiment. Alternatively, as shown in FIG. 11, an electrode 52 made of a conducting material may be formed between the electric lines 31a and laser light source 20 in order to electrically couple the electric lines to the laser light source. When the electric lines are coupled to the laser light source via the electrode 52, once the laser light source 20 is placed on the upper surface of the electric wiring 31 (FPC), the laser light source 20 becomes conducting. Production efficiency can be improved.

(Second Embodiment)

Next, the second embodiment of the present invention will be described in conjunction with FIG. 12. The present embodiment is different from the first embodiment only in the construction of a laser light source. The other components are substantially identical to those of the first embodiment. The same reference numerals are assigned to the identical components. An iterative description will be omitted.

Figure 12:
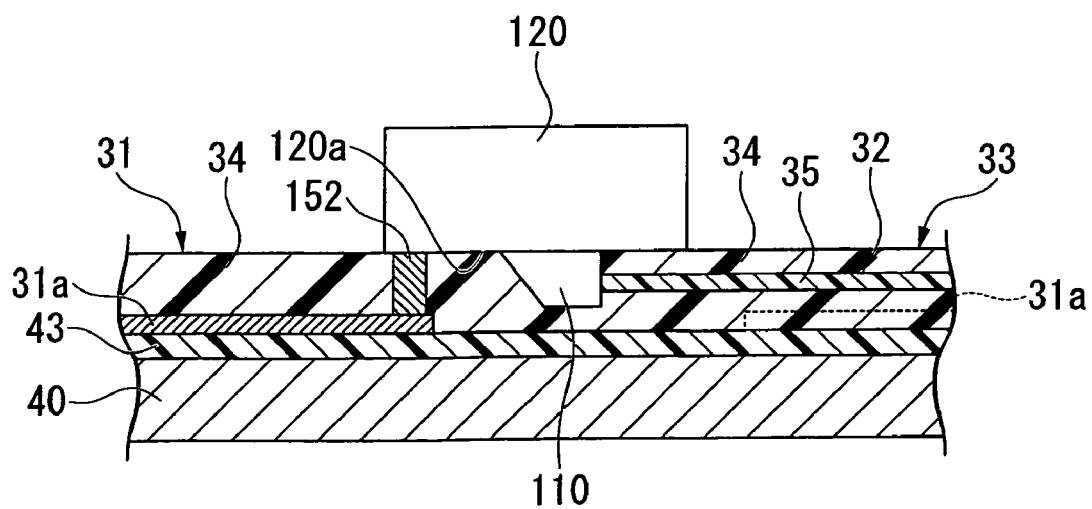
FIG. 12 is a partial sectional view (equivalent to the sectional view along the E-E cutting-plane line shown in FIG. 5) of a head gimbal assembly in accordance with the second embodiment of the present invention.
Figure 13:
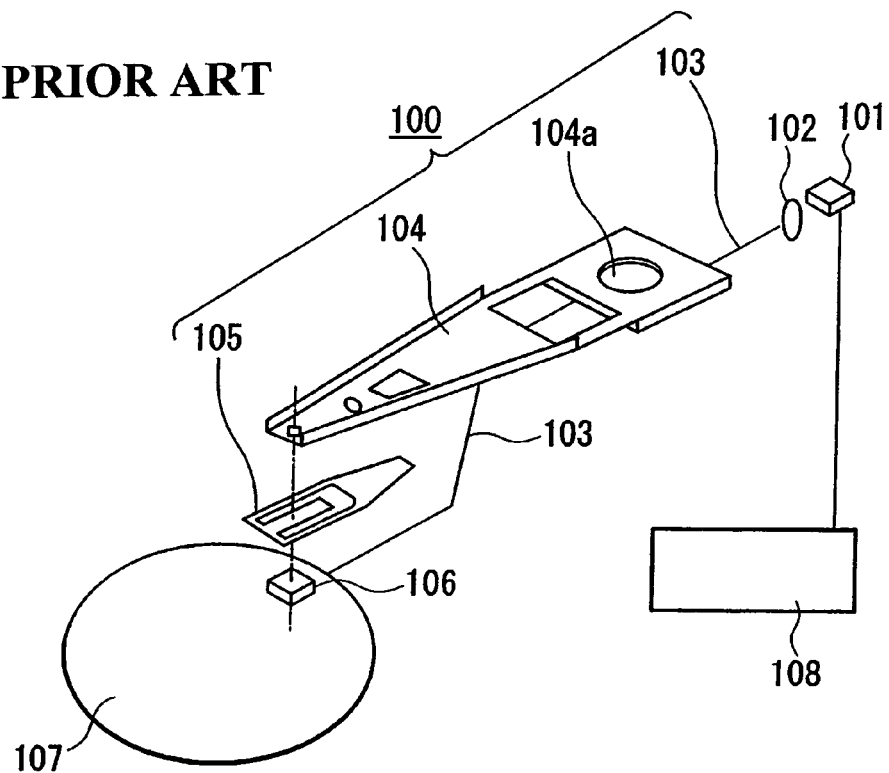
FIG. 13 is a schematic construction diagram of an existing head gimbal assembly.

As shown in FIG. 12, a laser light source 120 employed in the present embodiment is a surface-emitting laser (a vertical cavity surface-emitting laser (VCSEL)). Namely, the laser light source 120 that emits light from the bottom 120a thereof is adopted. When the laser light source 120 is adopted, an electrode 152 made of a conducting material is formed between the electric lines 31a and bottom 120a in order to electrically connect the laser light source 120 to the electric lines. A reflecting mirror 110 is disposed to abut on a light emitting portion of the bottom 120a of the laser light source 120. The reflecting mirror 110 has the angle thereof adjusted so that light emitting from the laser light source 120 will be reflected from the reflecting mirror and then introduced into the optical waveguide 32.

According to the present embodiment, since the laser light source 120 is disposed on the support 40 borne by the rotary member 13 (composed of the carriage 11 and head gimbal assembly 12), the necessity of aligning the light source after attaching the suspension 3 to the arm 14 is obviated. Specifically, when the suspension 3 is attached to the arm 14, alignment of the light source is already completed. Therefore, efficiency in production of the head gimbal assembly 12 can be improved, and a cost of manufacture can be reduced. In addition, since the laser light source 120 is located at a position closer to the slider 2 than it previously is, a loss in an amount of light occurring through the optical waveguide 32 can be minimized, and optical efficiency can be improved. Further, compared with a case where the laser light source 120 is mounted in the slider 2, heat dissipation from the light source is readily achieved. Eventually, performance is reliably maintained.

A flexible printed circuit (FPC) board for feeding power to the magnetic element of the slider 2 is formed on the flexure 25 (support 40) joined to the load beam 24 included in the rotary member 13, and the laser light source 120 is disposed on the FPC board. In other words, once the laser light source 120 is disposed on the FPC board, the head gimbal assembly 12 is realized. Therefore, the head gimbal assembly 12 can be easily constructed, and a cost of manufacture can be reduced.

According to the present embodiment, a surface-emitting laser is adopted as the laser light source 120. Therefore, the reflecting mirror 110 should be disposed at a desired position so that laser light reflected from the reflecting mirror will be introduced into the optical waveguide 32, and the laser light source 120 should be disposed to conduct over the electric lines 31a. Thus, the head gimbal assembly is realized. Therefore, mounting is easy to do, and a cost of manufacture is reduced.

Since the information recording/reproducing apparatus 1 employs the foregoing head gimbal assembly 12, the information recording/reproducing apparatus 1 can be produced at a low cost, and the optical efficiency of the information recording/reproducing apparatus 1 is improved.

The present invention is not limited to the aforesaid embodiments, but encompasses various variants in which the embodiments are modified within the gist of the present invention. Namely, the constructions and shapes presented in relation to the embodiments are mere examples and can be appropriately modified.

For example, in the aforesaid embodiments, the head gimbal assembly is disposed on one of the surfaces of each arm. Alternatively, the head gimbal assembly may be disposed on both the surfaces of the arm, which is interposed between disks, so that the head gimbal assembly will be opposed to each of the disks. In this case, each slider of the head gimbal assemblies disposed on the respective surfaces of the arm is used to record or reproduce information in or from a disk surface opposed to the slider. In other words, using one arm, information can be recorded or reproduced in or from two disks. Therefore, the recording capacity of an information recording/reproducing apparatus is increased, and the information recording/reproducing apparatus is designed compactly.

In the aforesaid embodiments, an air-cushion type information recording/reproducing apparatus in which each slider is floated has been taken for instance. The present invention is not limited to the type of information recording/reproducing apparatus. As long as a slider is opposed to a disk surface, the slider and disk may be in contact with each other. Namely, the slider employed in the present invention may be a contact type slider. Even in this case, the same operation and advantage as those described above can be provided.

Figure 14:
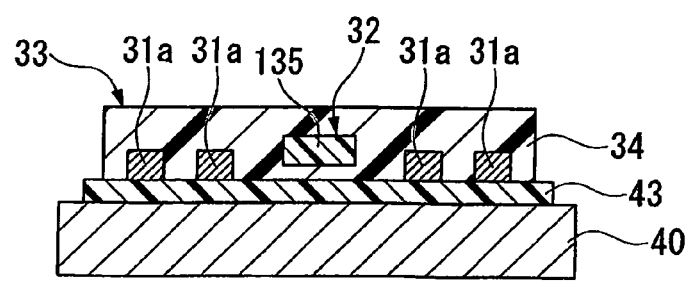
FIG. 14 is a sectional view (equivalent to FIG. 7) showing another form (1) of a photoelectric complex wiring included in the embodiment of the present invention.
Figure 15:
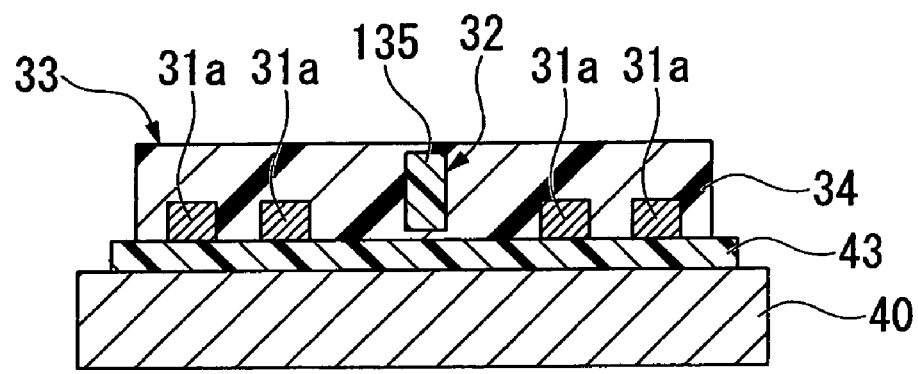
FIG. 15 is a sectional view (equivalent to FIG. 7) showing another form (2) of the photoelectric complex wiring included in the embodiment of the present invention.

In the aforesaid embodiments, the sectional shape of the core 35 included in the photoelectric complex wiring 33 is a square. As shown in FIG. 14, a core 135 may be formed to have a rectangular section. The core 135 is formed so that the long axis of the rectangular section thereof will be parallel to the surface of the support 40. Alternatively, as shown in FIG. 15, the core 135 may be formed so that the long axis thereof will be perpendicular to the surface of the support 40.

Specifically, when the ratio of the long axis of the rectangular section of the core 135 to the short axis thereof exceeds 1, while light is propagated through the core 135, linearly polarized light can be sustained. Preferably, the ratio of the long axis of the rectangular section of the core 135 to the short axis thereof is equal to or larger than 1.1. For example, when the core 135 is produced through photolithography, the core 135 having a desired shape can be produced by changing the thickness of a material to be made into the core. A description has been made of a case where the sectional shape of the core 135 is a rectangle. Alternatively, the sectional shape may be an ellipse or any other flattened shape.

Figure 16:
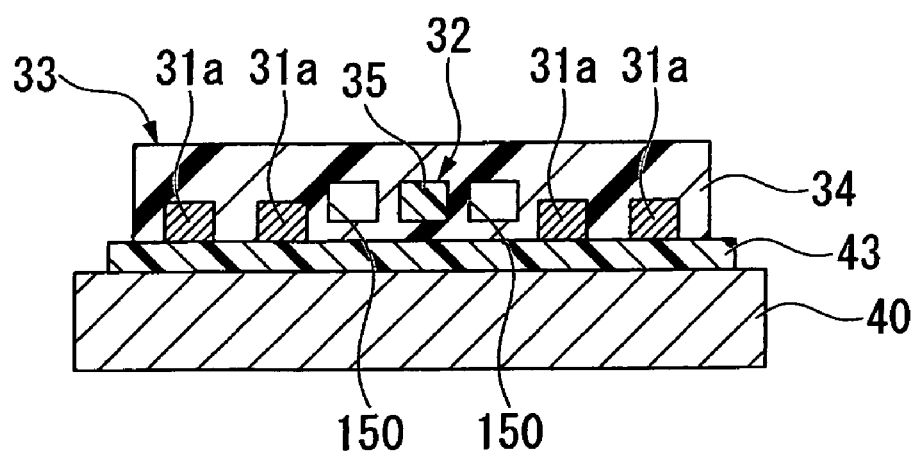
FIG. 16 is a sectional view (equivalent to FIG. 7) showing another form (3) of the photoelectric complex wiring included in the embodiment of the present invention.
Figure 17:
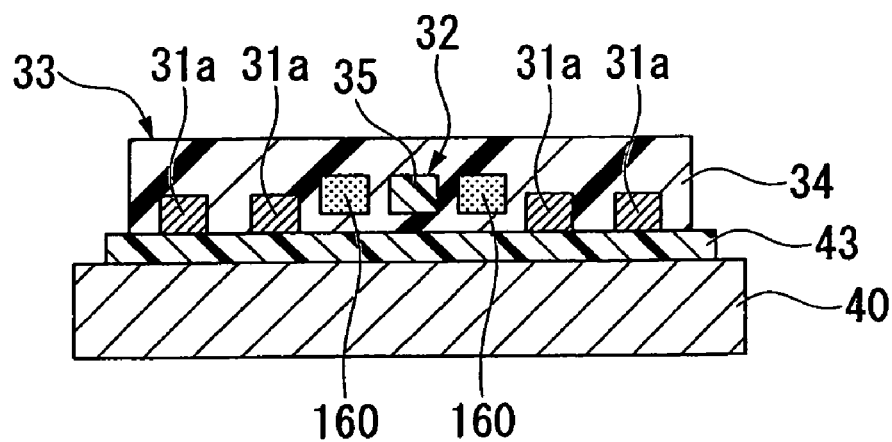
FIG. 17 is a sectional view (equivalent to FIG. 7) showing another form (4) of the photoelectric complex wiring included in the embodiment of the present invention.

As long as linearly polarized light can be sustained, the present invention is not limited to the foregoing structure. As shown in FIG. 16, spaces (tunnels) 150 may be formed on the respective sides of the core 35. As shown in FIG. 17, stress application sections 160 for use in applying a stress in a direction in which the section of the core is compressed may be formed around the core 35. The stress application sections 160 can be formed by injecting a material whose coefficient of thermal expansion is different from that of the cladding 34. The stress application sections 160 may be formed by irradiating an ion beam to specific areas in the cladding 34. The spaces 150 and stress application sections 160 formed on the right and left sides of the core 35 are shown in the drawings. Alternatively, the spaces 150 or stress application sections 160 may be formed up and down.

Figure 18:
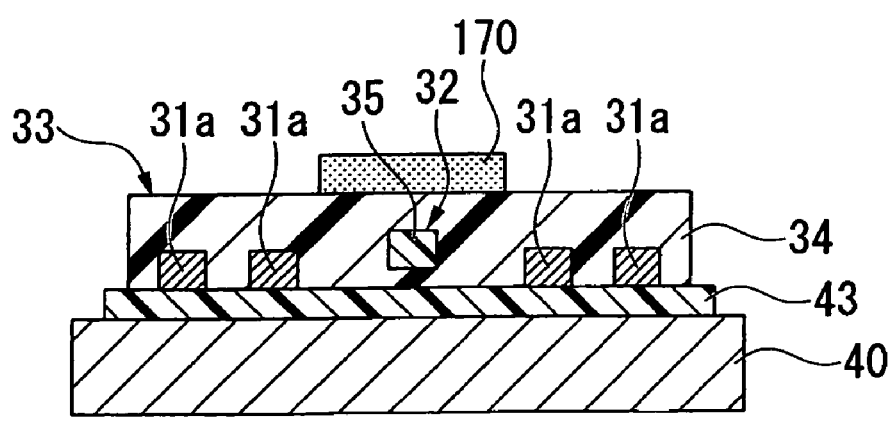
FIG. 18 is a sectional view (equivalent to FIG. 7) showing another form (5) of the photoelectric complex wiring included in the embodiment of the present invention.

As shown in FIG. 18, a stress application member 170 may be placed on the upper surface of the cladding 34 in order to compress the section of the core. Whichever of the methods is adopted, while light is propagated through the core 35, linearly polarized light can be sustained.

The embodiments have been described on the assumption that an information recording/reproducing apparatus utilizes near-field light. The present invention may be applied to an information recording/reproducing apparatus that utilizes spotlight.

The invention claimed is:

1. A head gimbal assembly for a rotary member mounted on a pivot shaft to undergo turning movement relative to a magnetic recording medium undergoing rotation in a preselected direction, the head gimbal assembly comprising:
a support configured to be supported by the rotary member;
a slider attached to a distal end of the support for confronting a surface of a magnetic recording medium;
an optical waveguide connected to the slider for introducing into the slider light with which the magnetic recording medium is heated;
a light source disposed on the support for emitting a light beam that is irradiated onto the optical waveguide; and
an electric wiring for supplying power to the light source and the slider.

2. A head gimbal assembly according to claim 1; wherein:
the rotary member has an arm mounted on the pivot shaft to undergo turning movement, a base plate mounted on a distal side of the arm, a hinge plate connected to the base plate and having an extension that extends toward a distal side of the base plate, and a load beam connected to the extension of the hinge plate; and
the support is connected to the load beam and extends from a flexure on which the slider is disposed.

3. A head gimbal assembly according to claim 1 or 2; wherein the light source comprises a surface-emitting laser.

4. A head gimbal assembly according to claim 1 or 2; wherein the light source comprises an edge-emitting laser.

5. A head gimbal assembly according to claim 4; wherein the optical waveguide is formed with an optical fiber.

6. A head gimbal assembly according to claim 1; wherein:
the optical waveguide has a core through which light advances;
a section of the core lies in a direction orthogonal to an advancing direction of the light beam;
the section has a first axis that determines the width of the section and passes through the center of the section, and a second axis that is orthogonal to the first axis and passes through the center of the section; and
the first axis and the second axis have different lengths.

7. A head gimbal assembly according to claim 6; wherein the section is rectangular-shaped and a ratio of the first axis to the second axis is set to 1.1 or more.

8. A head gimbal assembly according to claim 1; wherein:
the optical waveguide has a core through which light advances; and
spaces are formed on respective sides of the core.

9. A head gimbal assembly according to claim 1; wherein:
the optical waveguide has a core through which light advances; and
stress application sections for use in applying a stress in a direction in which the section of the core is compressed are formed on respective sides of the core.

10. A head gimbal assembly according to claim 1; wherein:
the optical waveguide has a core through which light advances and a cladding covering the core; and
a stress application member for use in applying a stress in a direction in which a section of the core is compressed is disposed on the surface of the cladding.

11. An information recording/reproducing apparatus comprising:
a head gimbal assembly according to claim 1;
magnetic recording media mounted to undergo rotation in a preselected direction;
a pivot shaft mounted relative to the magnetic recording media;
a plurality of arms mounted on the pivot shaft for undergoing turning movement;
an actuator supporting proximal sides of the arms for moving the arms in a direction parallel to surfaces of the magnetic recording media;
a rotary drive unit for rotating the magnetic recording media in the preselected direction; and
a control unit for controlling an operation of the slider and the light source of the head gimbal assembly.

12. An information recording/reproducing apparatus comprising:
a head gimbal assembly according to claim 3;
magnetic recording media mounted to undergo rotation in a preselected direction;
a pivot shaft mounted relative to the magnetic recording media;
a plurality of arms mounted on the pivot shaft for undergoing turning movement;
an actuator supporting proximal sides of the arms for moving the arms in a direction parallel to surfaces of the magnetic recording media;
a rotary drive unit for rotating the magnetic recording media in the preselected direction; and
a control unit for controlling an operation of the slider and the light source of the head gimbal assembly.

13. An information recording/reproducing apparatus comprising:
a head gimbal assembly according to claim 4;
magnetic recording media mounted to undergo rotation in a preselected direction;

a pivot shaft mounted relative to the magnetic recording media;

a plurality of arms mounted on the pivot shaft for undergoing turning movement;

an actuator supporting proximal sides of the arms for moving the arms in a direction parallel to surfaces of the magnetic recording media;

a rotary drive unit for rotating the magnetic recording media in the preselected direction; and a control unit for controlling an operation of the slider and the light source of the head gimbal assembly.

14. A head gimbal assembly according to claim 1; wherein the support is configured to flexibly support the light source, the optical waveguide and the slider.

15. A head gimbal assembly comprising:

a slider having reproduction/reproducing elements for reproducing and recording information to/from a surface of a recording medium;

a suspension for flexibly supporting the slider opposite to a surface of a recording medium;

a light source disposed on the suspension for emitting a light beam; and an optical waveguide disposed between the slider and the laser light source for introducing a light beam from the light source into the slider.

16. A head gimbal assembly according to claim 15; wherein the light source comprises a surface-emitting laser.

17. A head gimbal assembly according to claim 15; wherein the light source comprises an edge-emitting laser.

18. An information recording/reproducing apparatus comprising:

a head gimbal assembly according to claim 15;

an actuator for moving the head gimbal assembly relative to a surface of a recording medium; and a control unit for supplying a current to the slider of the head gimbal assembly.

19. A head gimbal assembly according to claim 15; wherein the suspension is configured to flexibly support the light source, the optical waveguide and the slider.

20. A head gimbal assembly comprising:

a slider having reproduction/reproducing elements for reproducing and recording information to/from a surface of a recording medium;

a suspension for flexibly supporting the slider opposite to a surface of a recording medium;

a light source disposed on the suspension for emitting a light beam;

electric wiring lines disposed between the light source and the slider for supplying power to the slider and the light source; and an optical waveguide disposed between the slider and the light source for introducing a light beam from the light source into the slider.

* * * * *